May 8, 1934. V. NIXON 1,957,722
WIRE STRIPPING TOOL
Filed April 21, 1932
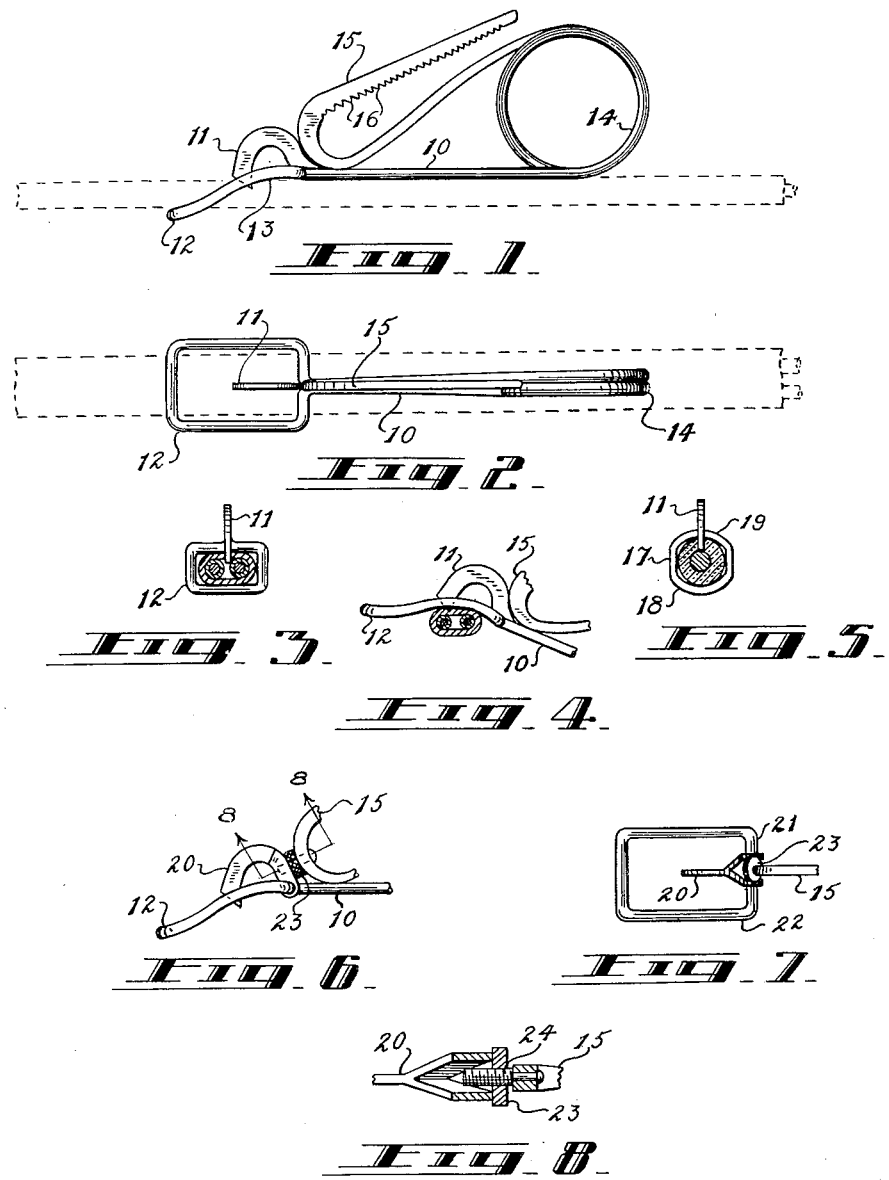
INVENTOR
Valmer Nixon
BY
Attorney Patented May 8, 1934

1,957,722

UNITED STATES PATENT OFFICE 1,957,722

WIRE STRIPPING TOOL

Valmer Nixon, Osgoode, Ontario, Canada

Application April 21, 1932, Serial No. 606,651
In Canada April 21, 1931

4 Claims. (Cl. 81—9.5)

This present invention relates to improvements in a wire stripping tool and appertains particularly to a device of this character intended primarily to slit the casing or loom to facilitate its removal.

An object of the invention is to provide a wire stripper that will cut the casing without any possibility of damaging the cable.

A further object of the invention is to provide a wire stripper of this type that is simply threaded on the cable and pulled off, the free end moving automatically into operation yet guarded all the while against danger of cutting too deep.

A still further object of the invention is the provision of a wire stripping tool with a knife surrounded by a protecting guard that positively centers the knife and gauges its cutting depth without possibility of failure.

A further object of this invention is the provision of a wire stripping tool, formed preferably from a single strand of wire, that is rolled and bent on itself to provide a handle and guard and terminally tempered at one end and sharpened into a cutting blade.

A still further object of this invention is the provision of a wire stripping tool of the nature and for the purpose described that is characterized by structural simplicity, durability and low cost of production rendering the same commercially desirable.

To the accomplishment of these and related objects as shall become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawing forming a part of this disclosure wherein like characters indicate like parts throughout the several views.

In the drawing:—

Figure 1 is a side elevation of my wire stripping tool in operative cutting position on a cable whose jacket or loom is about to be slit longitudinally;

Figure 2 is a plan view thereof;

Figure 3 is an end elevation;

Figure 4 is a detail side elevation of the tool cutting the jacket or loom circumferentially;

Figure 5 is an end elevation of a modified form of tool for use with a round rubber coated cable;

Figure 6 is a detail side elevation of a modified form of wire stripper with an adjustable blade;

Figure 7 is a detail plan view thereof; and

Figure 8 is an enlarged section as taken on the line 8—8 of Figure 6.

The tool is formed from a single strand of wire 10 tempered and sharpened at one end and bent thereat into a sharp pointed hook-like knife 11. From the inner end of this knife the strand bends outwards at a right angle and thence around the knife to enclose it within an oblong guard 12. On opposite sides of the knife 11, the guard, in the plane of the oblong, is arched as at 13 so that the knife, though its cutting point does not extend below the lower lever of the guard, does project below the sides of the oblong frame 12 between the arches 13, a measured distance equalling the thickness of the casing or loom.

After describing this oblong enclosure to guard the knife, the wire strand then bends backwards away from the knife, and substantially aligned with it mid way of the narrow arched sides of the oblong guard and being looped vertically once and a half on itself, in a plane at right angles to the oblong guard 12, to form a handle 14 returns to join its stem to the rear of the knife and then bends back as an open U, above the handle flaring slightly past a restricted neck and terminating short of the end of the handle 14 provides a saw 15 with the teeth 16 on the inner side thereof.

At the common junction of the knife 11 with the guard 12, the guard 12 with the handle 14 and the handle 14 with the saw 15, a spot of solder 16 is employed to strengthen and rigidify the structure.

In the modified form shown in Figure 5, the oblong guard 17 has its outer end 18 concaved to embrace the underside of a round cable and the back or inner end of this guard reversely rounded in a convex or arch 19 to straddle and centre the knife on a round rubber coated single strand cable as shown.

In the further modification shown in Figures 6 7 and 8, the cutting knife 20 is hinged in the frame 21 and adjustable with respect thereto for varying its cutting depth beyond the guard 22 by the knurled nut 23 riding on the stud 24 that is fastened in the frame.

When the end of a cable is to be stripped of its outer covering or loom the tool is arranged on it as shown in Figures 1, 2 or 3, and pulled off the end, the outer end of the guard underlying the strand, by virtue of the longitudinal draft, hinges the knife into penetration of the loom and the lengthwise ripping of the loom wrapper results, the equal spacing of the sides of the guard from the knife keeps it centered so that it cuts the loom wrapper between the wire strands of the double cable shown without possibility of damaging the individual cables. The tool is next grasped firmly in the hand as when using a paring tool and with the thumb pressing the cable into the arched sides of the guard and against the point of the knife, as shown in Figure 4, it is then moved circumferentially around the cable just outside of the inner end of the longitudinally cut. This severs the loom wrapper completely and the ripper cords which can be dispensed with, and the fibre wrappings of the individual cables are then cleared off with the help of the close necked saw.

From the foregoing description taken in connection with the accompanying drawing, it will be manifest that a wire stripping tool is provided that will fulfill all the necessary requirements of such a device but as many changes could be made in the above description and many apparently widely different embodiments of my invention may be constructed within the scope of the appended claims without departing from the spirit or scope thereof, it is intended that all matters contained in the said accompanying specification and drawing shall be interpreted as illustrative and not in a limitative or restrictive sense.

Having thus described my invention, what I claim as new and desire to secure by Letters Patent is:—

1. A wire stripping tool having a longitudinally disposed knife and an integral work-embracing guard to center said knife and limit the depth to which it may cut.

2. A wire stripping tool comprising a knife, an oblong guard surrounding the same, the outer closed end of said oblong guard serving as a fulcrum for the tool, the inner end as a gauge with respect to the knife to limit the depth of its penetration and the equally spaced sides of said oblong guard centering said knife.

3. A wire stripping tool having a hooked and pointed knife and an open oblong guard surrounding the point of said knife, the opposite sides of said guard being arched upwards in transverse line with the point of said knife to expose the same a predetermined distance.

4. A wire stripping tool as described comprising a strand of wire sharpened as a knife at one end, a portion surrounding said knife as a guard extending at an angle away from the guard describing a loop and a half in a plane at right angles to said guard, to form a handle and then extending back over the handle to provide a cleaning saw, the whole being united at certain points to rigidify the structure.

VALMER NIXON. [L. S.]